Patented Dec. 13, 1932

1,890,585

UNITED STATES PATENT OFFICE

ROY C. NEWTON AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS

METHOD OF STABILIZING FATS AND OILS

No Drawing. Application filed March 28, 1930. Serial No. 439,347.

This invention relates to an improved process of treating oils and fats, and more particularly a process of stabilizing oils and fats against rancidity.

The tendency of ordinary animal and vegetable oils and fats to become rancid, when exposed to the oxygen of the air, is well known; and the effect of various substances of a catalytic nature in promoting or retarding such tendency and the velocity of the reaction has been studied by numerous investigators.

The present invention is based upon the discovery that the tendency of oils and fats to become rancid can be retarded by treatment with a carotinoid pigment. We have found that the addition of carotinoid pigment alone retards the onset and course of rancidity; but that this retarding can be considerably augmented by heat treatment.

In carrying out our invention, we add to the oil or fat the naturally occurring pigments of the carotinoid group and follow this addition by heat treatment. The action of the carotinoid pigment under heat treatment results in a considerable bleaching effect so that the oil or fat after treatment is of a much lighter color than it is after the addition of the carotinoid pigment and before the heat treatment. The carotinoid pigments, being naturally occurring lipochromes, color the fat to a yellow or orange shade.

The heat treatment of the oil or fat, following the addition of the carotinoid pigment, may be accompanied by hydrogenation, or by refining processes involving the addition of alkalies, or by deodorization by means of steam or gases at elevated temperatures. Ordinarily, in the heat treatment the temperature is maintained above the boiling point of water, but below the decomposition temperature of the fat under treatment.

The carotinoid pigment employed in the present process may be that extracted from carrots, alfalfa leaves or other sources; or it may be added to the oil or fat in the form of palm oil or other highly colored fat in which this type of pigment is present in considerable concentration.

According to one preferred method of carrying out the invention, there is added to lard, peanut oil, cocoanut oil, cotton seed oil, corn oil, or other oil or fat, about 5% of palm oil, and the mixture is then heated and refined and deodorized; or the mixture may be refined, hydrogenized and deodorized. While 5% to 10% of palm oil is a convenient and sufficient amount to add in most cases in carrying out the invention to a practical conclusion, the invention is not limited to this amount and may vary over a considerable range, for example, between 1% and 50% or more. The upper limit is determined by the practicability of applying the refining process and of producing the light colored final product. If the palm oil which is used has a low fatty acid content and if there is no objection to a certain amount of color in the final product, a considerable percentage of palm oil can be used. With a good grade of palm oil, complete bleaching may be attained during the course of ordinary deodorizing, or of hydrogenation, or both, even though very large quantities of palm oil are used.

Instead of using palm oil as a source of the carotin, carotin derived from other sources may be used, and added in large or small amounts, depending upon the degree of stability which it is desired to attain. The degree of stability can be determined by well known laboratory methods, such, for example, as holding a sample under heat at various temperatures and determining the time required for the onset of rancidity; or by determining the oxygen absorption constants of the product; or by determining the aldehydes produced at a given temperature during a given time when air or oxygen is bubbled through the oil. For determining stability in bakery goods, the so-called pie crust test may be used, in which a given amount of oil or fat to be used as shortening is incorporated in the pie crust and the length of time required for the onset of rancidity at a given temperature determined. By such tests, the product of the present invention has been found to have a high rating, and to be a superior shortening product.

The invention will be further illustrated by the following example, giving a typical illustration of the way in which the invention may be applied, but it will be understood that the invention is not limited thereto:

There are introduced into an ordinary refining tank with a capacity of about 60,000 pounds, 57,000 pounds of cocoanut oil, cotton seed oil, oleo oil or lard, or other oil or fat, and about 3,000 pounds of a good grade of palm oil, preferably containing not more than 10% of free fatty acids, although a higher content of free fatty acid does not interfere with the subsequent processes. A highly colored palm oil containing much carotinoid pigment is desirable. The ingredients are introduced in the liquid form and are thereafter heated in the refining kettles to a suitable refining temperature, usually around 130 to 140° F. An amount of caustic soda proportioned to the free fatty acid content of the mixture is next introduced and the contents of the tank agitated until the soaps are formed and a break obtained, when agitation is stopped and the foots are allowed to settle. After the foots have settled, the supernatant oil is drawn off, clarified by filtering if necessary, with or without a clarifying agent such as diatomaceous or fuller's earth, and then introduced into a steam deodorizer, preferably a vacuum deodorizer, where the oils are heated to a suitable deodorizing temperature, for example, around 360 to 420° F., and for a sufficient time to obtain a bland product.

During the heating of the oils or fats, the carotinoid pigments undergo a bleaching action and are modified thereby. The refined product, produced according to the above example, is practically free from fatty acids and is colorless or white, or nearly so, in color, although with lower temperatures for deodorizing, products of various shades of yellow may be obtained. The product shows a negative Kreis test and is stabilized against rancidity so that it will keep much better in storage or in bakery products than the untreated oils or fats.

When the product is to be hydrogenated, the hydrogenation step or treatment is carried out after the product is refined and before deodorizing.

We have found that the maximum stabilizing effect of carotinoid pigments appears to be obtained when the product is subjected to hydrogenation with the pigment included. The presence of the pigment itself seems to have some effect on the course of the hydrogen absorption by the fat, apparently acting as a catalyst for hydrogenation. It may be also that the carotinoid pigments are broken down or hydrogenated during the hydrogenation in such a way that they become more effective as stabilizers or anti-oxidants than when subjected merely to heat treatment.

We claim:

1. The process of stabilizing fats and oils against rancidity which comprises adding carotinoid pigment thereto, treating the pigment-containing fat with caustic to remove free fatty acids, and subjecting the resultant product to heat treatment at temperatures between the boiling point of water and the decomposition point of the oil or fat.

2. The process of stabilizing fats and oils against rancidity which comprises adding carotinoid pigment to a fat or oil which is substantially free from free fatty acids, and subjecting the resultant mixture to heat treatment at a temperature sufficient to effect a bleaching of the mixture and the production of a light colored product.

3. The process of stabilizing fats and oils against rancidity which comprises adding carotinoid pigment thereto, treating with caustic to remove free fatty acids, hydrogenating the refined mixture to effect bleaching and increased stabilization of the mixture, and deodorizing the same.

4. The process of stabilizing fats and oils against rancidity which comprises adding thereto about 5 to 10% of palm oil rich in carotinoid pigment, treating the mixture with caustic to remove the free fatty acids, and subjecting thereafter to heat treatment at temperatures between the boiling point of water and the decomposition point of the oil or fat for a sufficient time to effect a bleaching of the mixture and the production of a light colored product.

5. The process of stabilizing fats and oils against rancidity which comprises adding thereto from 5 to 10% of palm oil, treating the mixture with caustic to remove free fatty acids, hydrogenating the refined mixture to effect bleaching and increased stabilization thereof and deodorizing the mixture.

6. The process of stabilizing lard against rancidity which comprises adding carotinoid pigment thereto, and subjecting the resulting product to heat treatment at temperatures between the boiling point of water and the decomposition temperature of the lard.

In testimony whereof I affix my signature.
ROY C. NEWTON.
In testimony whereof I affix my signature.
WILLIAM D. RICHARDSON.